(12) United States Patent
Maurer (10) Patent No.: US 11,926,043 B2
(45) Date of Patent: Mar. 12, 2024

(54) ROBOT FOR GRIPPING AND/OR HOLDING OBJECTS

(71) Applicant: SMW-Autoblok Spannsysteme GmbH, Meckenbeuren (DE)

(72) Inventor: Eckhard Maurer, Oberteuringen (DE)

(73) Assignee: SMW-Autoblok Spannsysteme GmbH (DE)

( * ) Notice: Subject to any disclaimer, the term of this patent is extended or adjusted under 35 U.S.C. 154(b) by 694 days.

(21) Appl. No.: 17/038,089

(22) Filed: Sep. 30, 2020

(65) Prior Publication Data
US 2021/0094192 A1   Apr. 1, 2021

(30) Foreign Application Priority Data

Oct. 1, 2019  (EP) .................................. 19200679
Sep. 9, 2020  (EP) .................................. 20195208

(51) Int. Cl.
*B25J 19/00*    (2006.01)
*B25J 15/02*    (2006.01)
(Continued)

(52) U.S. Cl.
CPC ....... *B25J 19/0041* (2013.01); *B25J 15/0253* (2013.01); *B25J 17/0241* (2013.01);
(Continued)

(58) Field of Classification Search
CPC ............... B25J 15/0042; B25J 15/0253; B25J 17/0241; B25J 19/0041; B25J 19/02; H04B 1/38
See application file for complete search history.

(56) References Cited

U.S. PATENT DOCUMENTS

| 4,830,569 A | 5/1989 | Jannborg |
| 5,624,364 A | 4/1997 | Zimmer |

(Continued)

FOREIGN PATENT DOCUMENTS

| EP | 0201685 | 11/1986 |
| JP | H 05293788 | 11/1993 |

(Continued)

*Primary Examiner* — Saul Rodriguez
*Assistant Examiner* — Brendan P Tighe
(74) *Attorney, Agent, or Firm* — Pandiscio & Pandiscio (57) ABSTRACT

In a robot (1) for gripping and/or holding objects (2), in particular workpieces, tools or carrier parts, the robot comprising:
at least one robot arm (3, 4, 5) which is supported on a support frame (19) and is movable in space in at least one translational and/or rotational degree of freedom,
a gripping and/or holding device (6), on which the respective object (2) is supported in a positionally oriented manner and/or held in a rotational arrangement,
at least one electric motor (9) provided in the gripping and/or holding device (6), by means of which a torque and/or a clamping force is generated which acts on the object (2), and
a drive shaft (24) mounted in the robot arm (5), which is coupled in a driving manner to the gripping and/or holding device (6), preferably in such a way that the gripping and/or holding device (6) rotates about its own longitudinal axis (6'),
the gripping and/or holding device (6) arranged at the free end of the robot arm (5) should be freely movable in space, so that rotation about its own longitudinal axis (6') can be carried out as often and as quickly as desired.
This is achieved in that an interface (31) is provided between a free end (10) of the robot arm (5) at the end and the gripping and/or holding device (6), which interface (31) is bridged by a coupler (25) fixed in a non-rotating arrange- (Continued)

ment to the robot arm (5) and by a flange (11) adapted thereto, which flange (11) is connected in a non-rotating arrangement to the gripping and/or holding device (6) and the drive shaft (24), in that a first inductively operated transceiver (12) is provided in the coupler (25), which transceiver (12) is connected to a power source (15) via an electrical line (14) fed to the robot arm (5), in that a second inductively operated transceiver (13) is provided in the flange (11), which is connected to the electric motor (9) in the gripping and/or holding device (6) via electrical lines (14), and in that an air gap (21) is provided between the coupler (25) and the flange (11) as a component of the interface (31).

11 Claims, 9 Drawing Sheets

(51) Int. Cl.
*B25J 17/02* (2006.01)
*B25J 15/00* (2006.01)
*B25J 19/02* (2006.01)
*H04B 1/38* (2015.01)

(52) U.S. Cl.
CPC ............ *B25J 15/0042* (2013.01); *B25J 19/02* (2013.01); *H04B 1/38* (2013.01)

(56) References Cited

U.S. PATENT DOCUMENTS

| | | |
|---|---|---|
| 10,037,848 B2 * | 7/2018 | Lange ............... H01F 27/24 |
| 2002/0057164 A1 | 5/2002 | Jin et al. |
| 2002/0118098 A1 * | 8/2002 | Apneseth ............ G08C 17/02 340/10.34 |
| 2011/0256995 A1 | 10/2011 | Takazakura et al. |
| 2018/0267168 A1 | 9/2018 | Kim |
| 2019/0097683 A1 * | 3/2019 | Tamaki ............... B25J 19/00 |
| 2020/0361091 A1 * | 11/2020 | Diankov ............... B25J 9/1687 |

FOREIGN PATENT DOCUMENTS

| | | |
|---|---|---|
| JP | H 0825015 | 1/1996 |
| WO | WO 2018/056452 | 3/2018 |
| WO | WO-2018056452 A1 * | 3/2018 |

* cited by examiner

ROBOT FOR GRIPPING AND/OR HOLDING OBJECTS

REFERENCE TO PENDING PRIOR PATENT APPLICATIONS

This patent application claims benefit of European Patent Application No. 19 200 679.9, filed Oct. 1, 2019, and European Patent Application No. 20 195 208.2, filed Sep. 9, 2020, which patent applications are hereby incorporated herein by reference.

FIELD OF THE INVENTION

The present invention relates to a robot for gripping and/or holding objects according to the pre-characterising clause of Patent claim 1.

BACKGROUND OF THE INVENTION

Robot systems have been used to support manual work for decades, for example in the manufacturing industry. The robots transport or hold heavy objects in space so that they are freely accessible for mechanical or manual processing.

The robots consist of several articulated robot arms connected to each other. The joints between the robot arms can be designed as cardan joints, swivel joints in the form of hinges or ball joints. Accordingly, the free end of the robot arm is movable in several rotational and/or translational degrees of freedom.

The drive systems required for the movement of the individual robot arms often consist of an electric motor, each of which must be connected to an electrical power source in order to obtain the required energy or electrical voltage, which causes the rotational movements of the individual robot arms.

To pick up the objects, the free end of the robot arm has a gripping and/or holding device in which another electric motor is installed. At least one thrust piece should be movable or driven by this electric motor. The respective driven thrust piece can therefore be moved in the direction of the longitudinal axis or perpendicular to the gripping and/or holding device and cooperates with at least one further thrust piece which is either fixed to the gripping and/or holding device or which is also coupled to the electric motor in a driveable manner and consequently the two thrust pieces can be moved towards or away from each other. The clamped object is arranged between the respective thrust pieces so that it is held between the thrust pieces by the feed force applied by the electric motor.

The gripping and/or holding device is supported on the robot arm at the end so that it can rotate about its own longitudinal axis, which means it can be turned counterclockwise or clockwise, for example to improve the free accessibility of the clamped object.

It has been found to be a disadvantage that the possibility of rotation of the gripping and/or holding device is limited, because the cables required for the electrical power supply of the electric motor limit the possibilities of rotation. This is because when a 360° angle of rotation is reached, the electrical cables twist into each other, regardless of whether they are laid inside or outside, between the robot arm and the connected gripping and/or holding device.

Consequently, robots of prior art can only perform a maximum rotation of 360°. As soon as the maximum angle of rotation is reached, it is imperative to reset the gripping and/or holding device. Consequently, robots of prior art can perform a rotation limited to +/−360° with respect to their longitudinal axis.

Even if the angle of rotation of the gripping and/or holding device is limited by stops or the like, the electrical cables are subject to considerable wear and tear, because the permanent rotation of the gripping and/or holding device exerts gravitational forces on the electrical cables, which cause the cables to break after a certain period of operation and therefore they have to be replaced.

U.S. Pat. No. 4,830,569 A, for example, discloses a contactless capacitive energy transfer for a robot arm.

The capacitive energy transfer is unsuitable in a disadvantageously manner, because the electric motor for operating the gripping and holding device at the free front end of the robot arm usually requires an enormous amount of energy and consequently the required energy cannot be provided by the capacitive transfer to a sufficient extent.

The capacitive energy transfer is considerably limited in its capacity, meaning that it does not supply sufficient electrical energy to move several components, namely gripper fingers or rotations of the gripper arm.

In addition, capacitive energy transfer devices have the disadvantage that the electrical conductors must be positioned at an extremely short distance from each other. The power or transmission rate for a capacitive energy transfer device between the primary source and the secondary sink or load doubles with each halving of the distance between these two sides and vice versa. Technically usable capacities for energy transmission in the range of a few watts are in the double-digit picofarad range. This means, however, that palm-sized surfaces, for example, are required as transmitters and receivers of the capacitive energy transmission device, since distances that should be greater than 1 mm operate with a low transmission rate. Especially with robots, however, the distance between the coupler and the flange has to be much larger, in particular to ensure the rotation of the robot arm.

In addition, the large-area transmitters and receivers of the capacitive energy transmission device require a considerable amount of space, because the size of the transmitters and receivers also determines the power rate of the capacitive energy transmission device.

SUMMARY OF THE INVENTION

It is therefore the task of the present invention to further develop a robot of the aforementioned type in such a way that the gripping and/or holding device arranged at the free end of the robot arm is freely movable in space, i.e. that the rotation about its own longitudinal axis can be carried out as often and quickly as desired without restricting the mechanical components necessary for the movements of the robot.

This task is solved in accordance with the present invention by the features of the characterising part of Patent claim 1:

Further advantageous embodiments of the present invention are derived from the subordinate claims.

In that an interface is provided between a free end of the robot arm at the end and the gripping and/or holding device, which interface is bridged by a coupler fixed in a non-rotating arrangement to the robot arm and by a flange adapted thereto, which flange is connected in a non-rotating arrangement to the gripping and/or holding device and the drive shaft, in that a first inductively operated transceiver is provided in the coupler, which transceiver is connected to a power source via an electrical line fed to the robot arm, in that a second inductively operated transceiver device is provided in the flange, which is connected to the electric motor in the gripping and/or holding device via electrical lines, in that an air gap is present between the coupler and the flange as a component of the interface, free rotation of the gripping and/or holding device in space is ensured, since the power supply to the electric motor present in the gripping and/or holding device is provided via the two inductively operated transceiver devices. The power supply of the electric motor via the two inductive transceiver devices allows a free and fast rotation of the gripping and/or holding device with any rotation angles. Wear and tear on the electrical cables which provide the energy supply for conventional robots is completely eliminated.

In addition, the two transceiver devices transmit electrical signals by which the movements of the thrust pieces can be adjusted and permanently monitored if at least one modulator and one demodulator are provided in each of the transceiver devices, by means of which electrical energy and/or electrical signals are alternately transmitted between the two transceiver devices.

Advantageously, the transceiver devices each consist of at least one pair of modulators and demodulators, by means of which the inductive transmission of signals or electrical energy can be carried out independently of each other. The pairs of modulators and demodulators transmit either the signals or the electrical energy. The signal or energy transmissions can be bidirectional, i.e. alternately in both directions from the electric motor to an evaluation device or vice versa from a power source to the electric motor. In addition, the signal or energy transmissions can be monitored and evaluated by suitable electrical sensors or other electromechanical components so that the operating status of the robot is permanently known. If necessary, due to existing error messages or deviations from the stored program sequence, suitable interventions in the operating sequence of the robot can be carried out externally by a suitable electrical device, for example a microprocessor. The corresponding measures serve on the one hand to optimise the robot's work sequence and on the other hand to execute the specified work sequence stored in a database as accurately as possible or to simulate it by means of the robot's movements.

BRIEF DESCRIPTION OF THE DRAWINGS

The drawings show a sample embodiment of a robot configured in accordance with the present invention, the details of which are explained below. In the drawings.

DETAILED DESCRIPTION OF THE PREFERRED EMBODIMENTS

Figure 1:
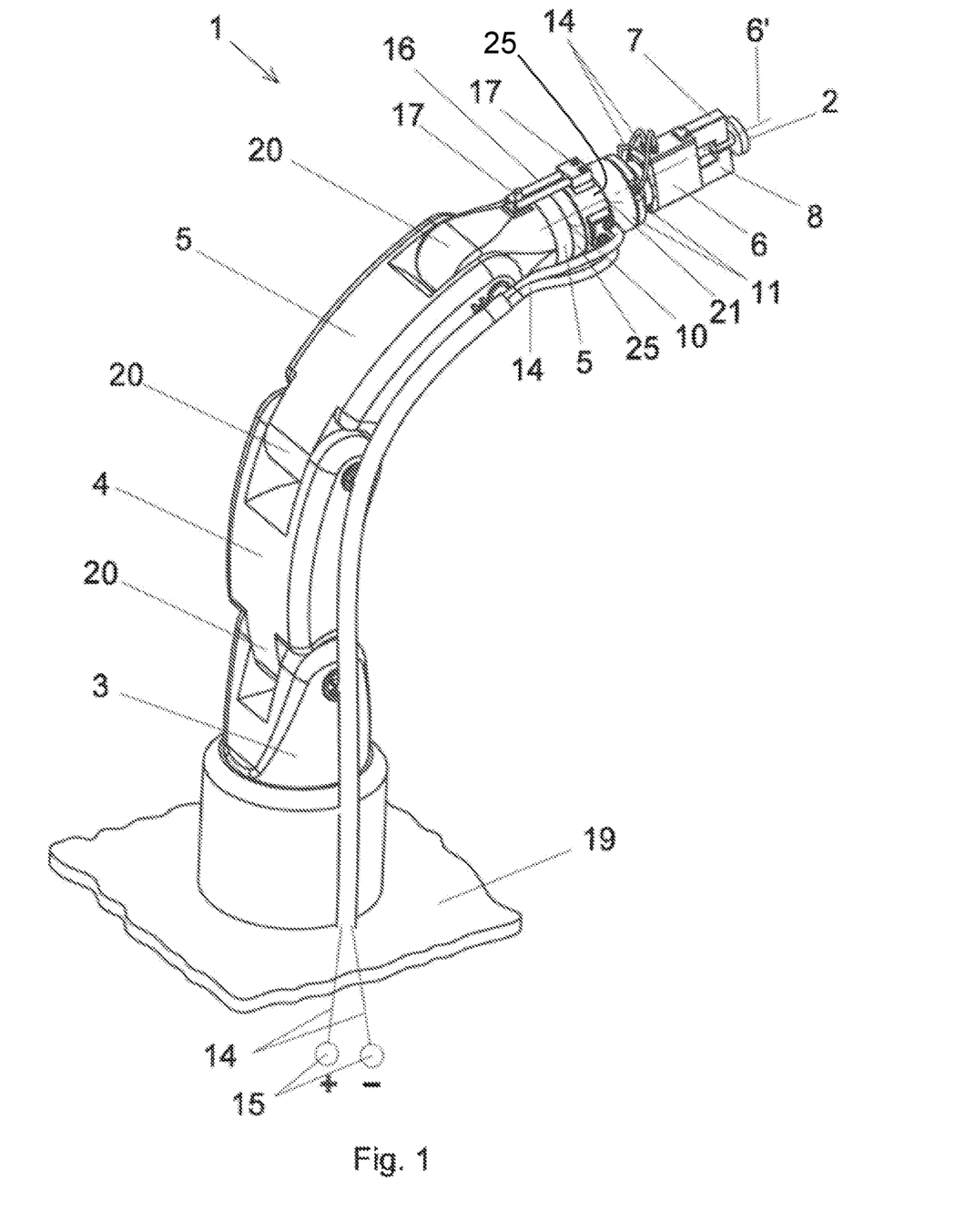
FIG. 1 shows a robot with three robot arms and a flange attached to the robot arm at the end, by which a gripping and/or holding device is rotatably driven, with two thrust pieces for holding an object associated with the gripping and/or holding device and supported in a radially moveable arrangement on the latter, in a perspective view.
Figure 2A:
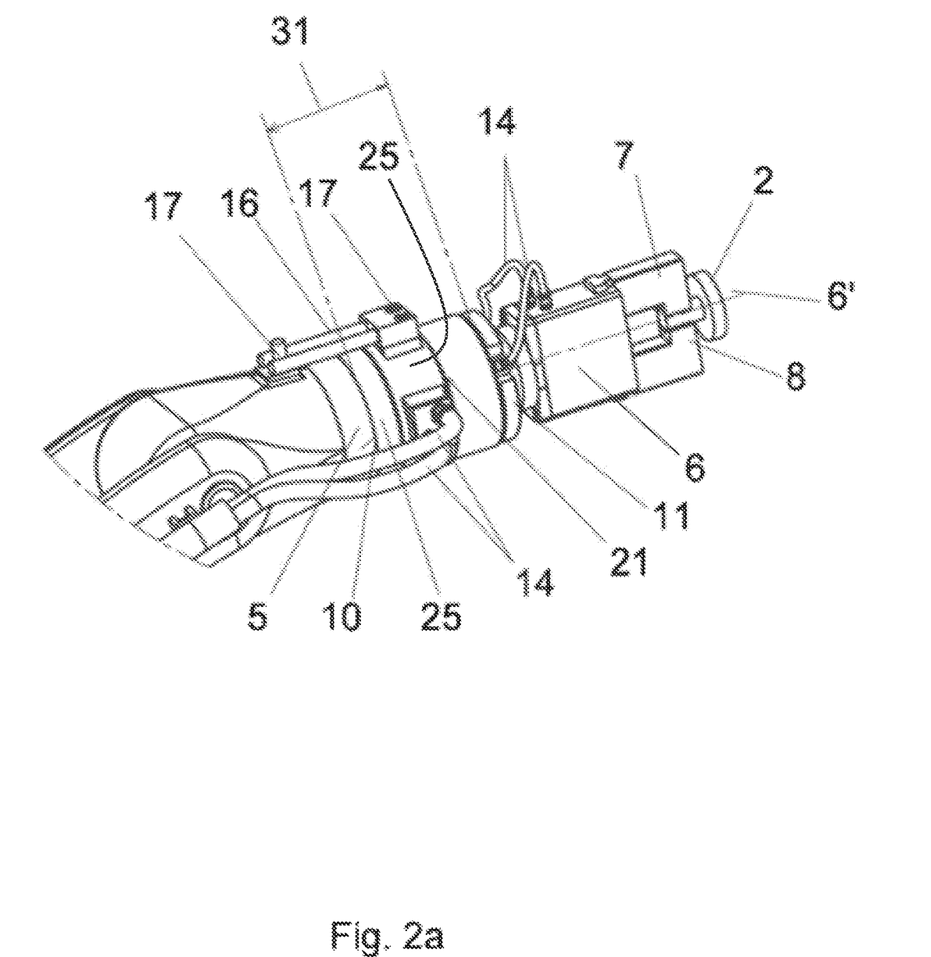
FIG. 2a shows an enlarged section of the free end of the robot arm at the end as shown in FIG. 1, with cabling running on the outside.
Figure 2B:
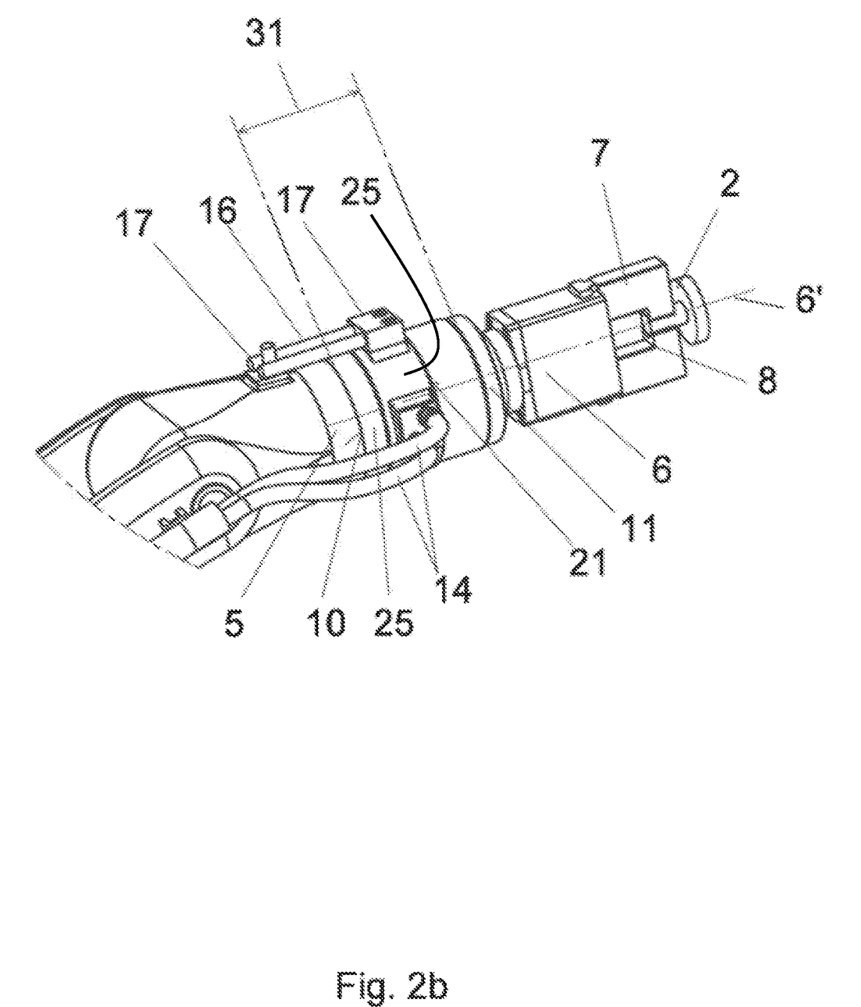
FIG. 2b shows the free end of the robot arm as shown in FIG. 1, with cabling running on the inside.
Figure 3A:
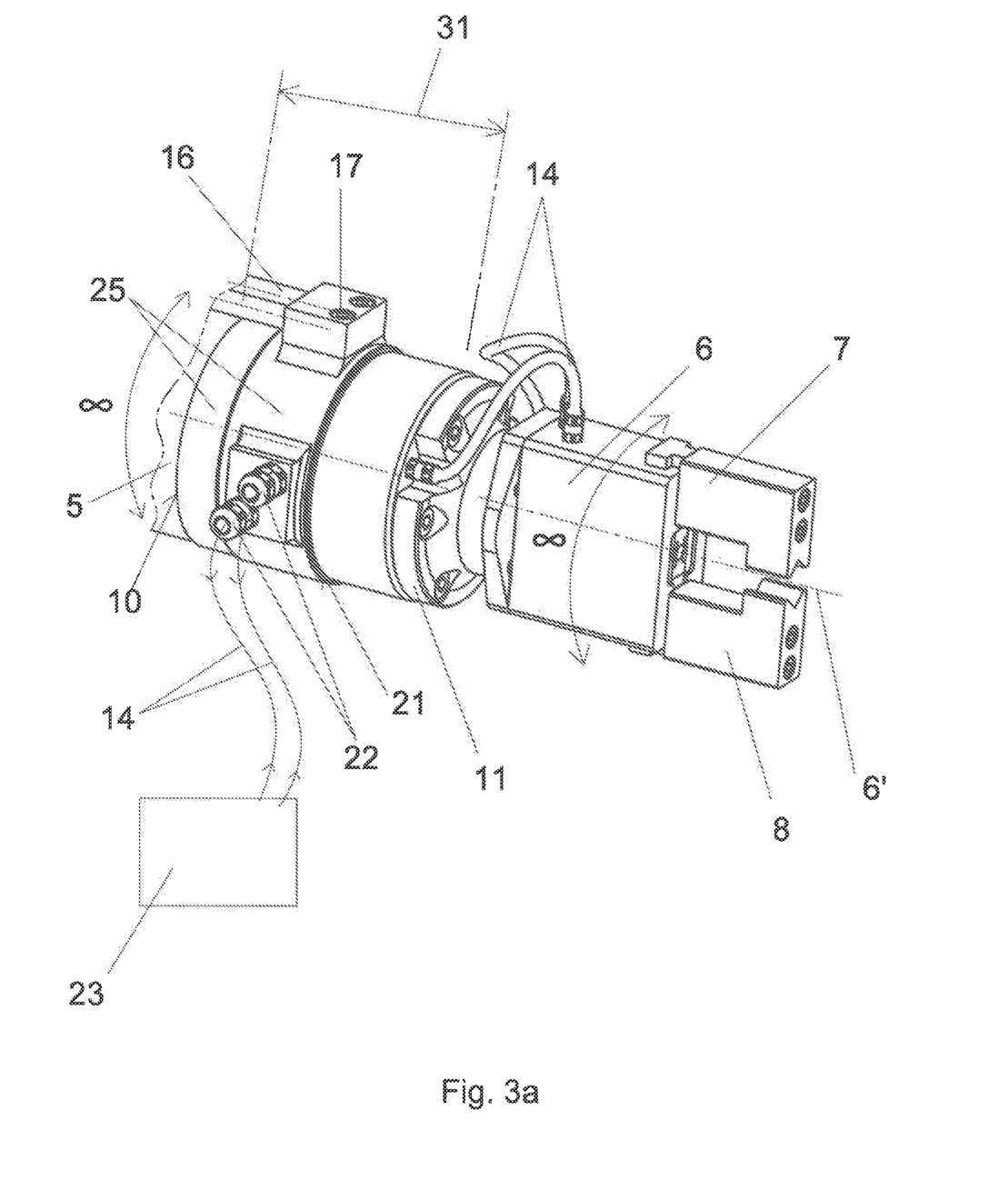
FIG. 3a shows the robot arm as shown in FIG. 2a, with electrical connections for power and/or signal transmission regarding the movement and control of the electric motor in the gripping and/or holding device.
Figure 3B:
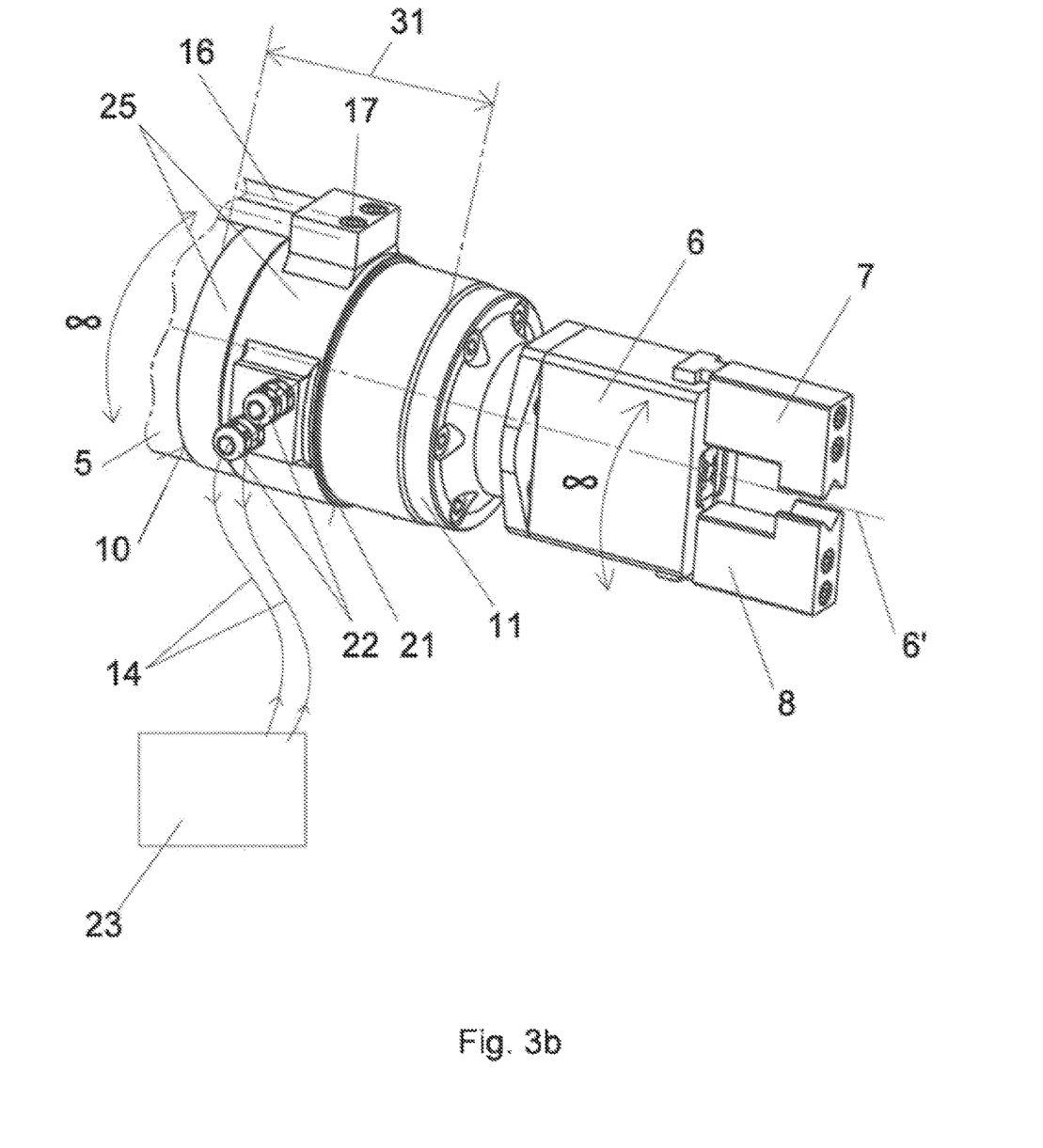
FIG. 3b shows the robot arm as shown in FIG. 2b, with electrical connections for power and/or signal transmission regarding the movement and control of the electric motor in the gripping and/or holding device.

FIG. 1 shows a robot 1 by means of which an object 2 is gripped and held in space.

The object 2 can optionally be a workpiece to be machined, on which machining steps can be carried out. If the object 2 is a tool, it is mounted and driven so that it can rotate about its own longitudinal axis. Objects 2 can also be other supporting parts by means of which the workpieces or tools are locked.

The robot 1 has three robot arms 3, 4 and 5, each connected to one another by a joint 20. Due to the existing joint 20, the robot arms 3, 4 and 5 can be moved relative to each other. The free end 10 of the robot arm 5 at the end can therefore be moved in six degrees of freedom, namely in three translational and three rotational degrees of freedom.

In addition, the first robot arm 3 is attached to a support frame 19. The support frame 19 can be a tool table, a machine frame or the like. A gripping and/or holding device 6 is attached to the robot arm 5 at its free end 10, which can be rotated about its longitudinal axis 6'. Two thrust pieces 7 and 8 are assigned to the gripping and/or holding device 6, which are mounted on the latter so as to be radially movable, i.e. in the sample embodiment shown, in the direction of the longitudinal axis 6' or, in the opposite direction, radially displaceable on the gripping and/or holding device 6. An electric motor 9 must be provided in the gripping and/or holding device 6 to drive the thrust pieces 7, 8.

In order to enable the gripping and/or holding device 6 to rotate about its longitudinal axis 6', a coupler 25 is provided on the robot arm 5 at the end at its free end 10, which is spatially spaced from the gripping and/or holding device 6.

FIGS. 3a, 3b, 4a and 4b in particular show that a flange 11 is provided between the coupler 25 and the gripping and/or holding device 6, by means of which the gripping and/or holding device 6 is attached to the robot arm 5. Often, the free ends 10 of the robot arms 5 are designed in such a way that customer-specific gripping and/or holding devices 6 cannot be directly attached to the robot arm 5. This transition area between the robot arm 5 at the end and the gripping and/or holding device (6) is by definition designated or represented as interface 31. In addition, the electric motor 9 in the gripping and/or holding device 6 must be supplied with both electrical energy or voltage and control signals for the operation of the gripping and/or holding device 6. In order to ensure the transmission of energy and signals between the robot arm 5 and the gripping and/or holding device 6 without electrical cables, an air gap 21 is therefore initially provided between the coupler 25 and the flange 11. In addition, the gripping and/or holding device 6 should rotate about its own longitudinal axis 6'. For this purpose, a drive shaft 24 is provided inside the coupler 25, which is designed in two parts, and is rotatably mounted in the coupler 25. The drive shaft 24 is in driving active connection with the flange 11, so that the rotational movements and speeds of the drive shaft 24 are directly transmitted to the flange 11. The flange 11 is coupled to the gripping and/or holding device 6 so that the rotational movements of the flange 11 are synchronously transmitted to the gripping and/or holding device 6. Consequently, 6 electrical lines 14 can run between the flange 11 and the gripping and/or holding device. The drive shaft 24 therefore passes through interface 31 and the air gap 21 assigned to it.

Two transceiver devices 12 and 13 as shown in FIGS. 4a to 5b are provided for power supply and/or signal transmission for the electric motor 9 in the gripping and/or holding device 6. The first transceiver 12 is installed in the coupler 25 and the second transceiver 13 in the flange 11 of the gripping and/or holding device 6. The two transceivers 12, 13 are inductively operated so that electrical energy and/or electrical signals can be alternately transmitted between these transceivers 12 and 13.

Figure 4A:
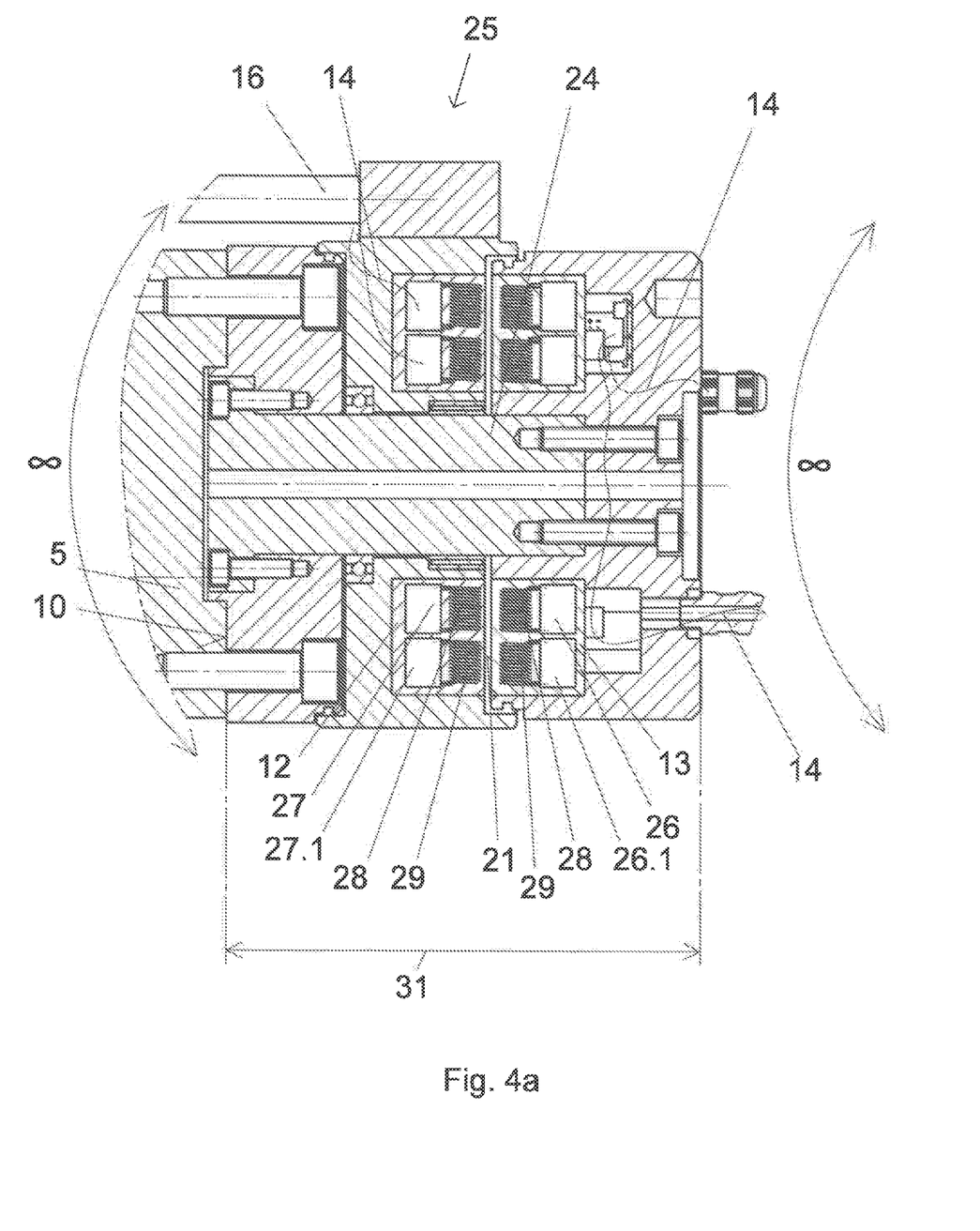
FIG. 4a shows a section through the robot arm as shown in FIG. 2a, showing the paired arrangements of modulators and demodulators for signal and power transmission.
Figure 4B:
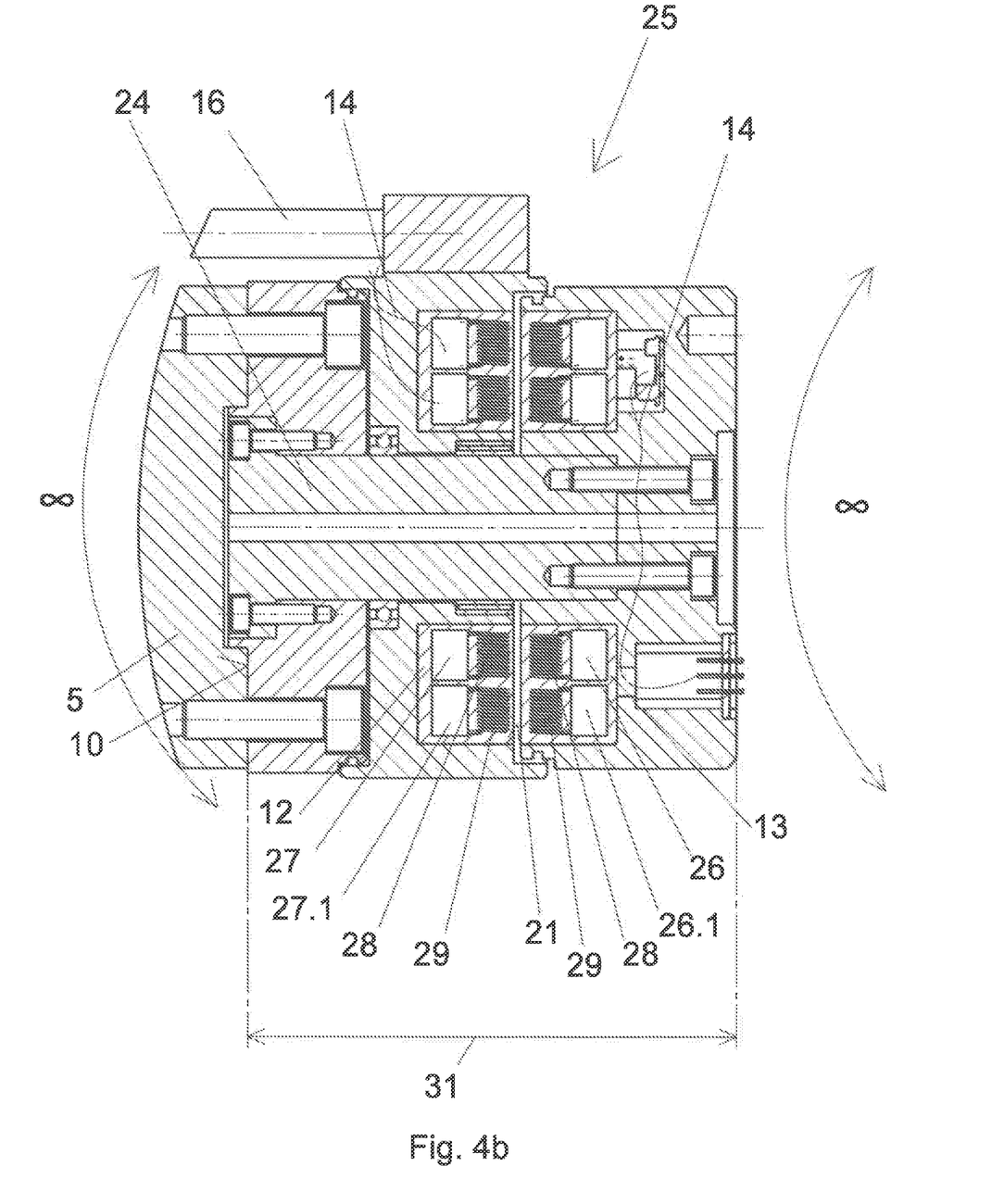
FIG. 4b shows a section through the robot arm as shown in FIG. 2b, showing the paired arrangements of modulators and demodulators for signal and power transmission.

The respective transceiver 12 or 13 consists of pairs of modulators 26 or 26.1 and demodulators 27 or 27.1. The respective modulators 26, 26.1 as well as demodulators 27 and 27.1 are arranged between the inductively operated coils 28 and 29, which thus work together in pairs. Each pair of modulators 26 and demodulators 27 and coils 28 alternately exchange or transmit signals. The other pair of modulator 26.1 and demodulators 27.1 as well as coils 29 alternately transmit energy for the control and operation of the electric motor 9.

The respective modulators 26 or 26.1 or the demodulators 27 or 27.1 thus form an interface 31 by which the air gap 21 between the coupler 9 and the flange 11 is bridged. Thus, signals and energy can be transmitted inductively and independently of each other by the respective pairs of modulators 26 or 26.1 and demodulators 27 or 27.1. This type of signal and/or energy transmission also offers the possibility of using sensors and other electrical components to provide permanent monitoring of the operating states of the robot 1, which can be evaluated by external electrical devices, such as microprocessors, and, if necessary, intervention in the operating sequence of robot 1 can be carried out from outside.

Therefore, on the one hand, the energy supply of the electric motor 9 can be provided via the transceiver devices 12 and 13 and, while on the other hand, electrical signals as shown in FIGS. 2a to 3b can be conducted alternately from a control device 23 via electrical connections 22 to the gripping and/or holding device 6. The control device 23 supplies parameters as well as feed motion signals to the electric motor 9 and the thrust pieces 7, 8 can be controlled in such a way that the applied holding forces are determined by sensors not shown and are passed on to the control device 23 in order to control the electric motor 9 in such a way that its clamping forces or torques are increased or reduced in some cases.

Both energy and signal transmission between the first transceiver 12 and the second transceiver 13 is purely inductive, so that the rotational movement of the flange 11 can take place unhindered by electrical lines.

The electrical lines 14 are therefore connected either to a power source 15 or to an electrical connection 26 as shown in FIGS. 2a to 3b. The electrical connection 22 is designed as an interface for the control device 23.

FIGS. 2a to 3b in particular show that the coupler 25 is attached to the robot arm 5 via a torque support 16 in a rotationally fixed manner. The rotation between the coupler 25 and the flange 11 of the gripping and/or holding device 6 is therefore carried out via the drive shaft 24, which runs inside the coupler 25 and the flange 11. The torque support 16 is fixed to the robot arm 5 and the drive flange 11 by means of two fastening screws 17.

Figure 5A:
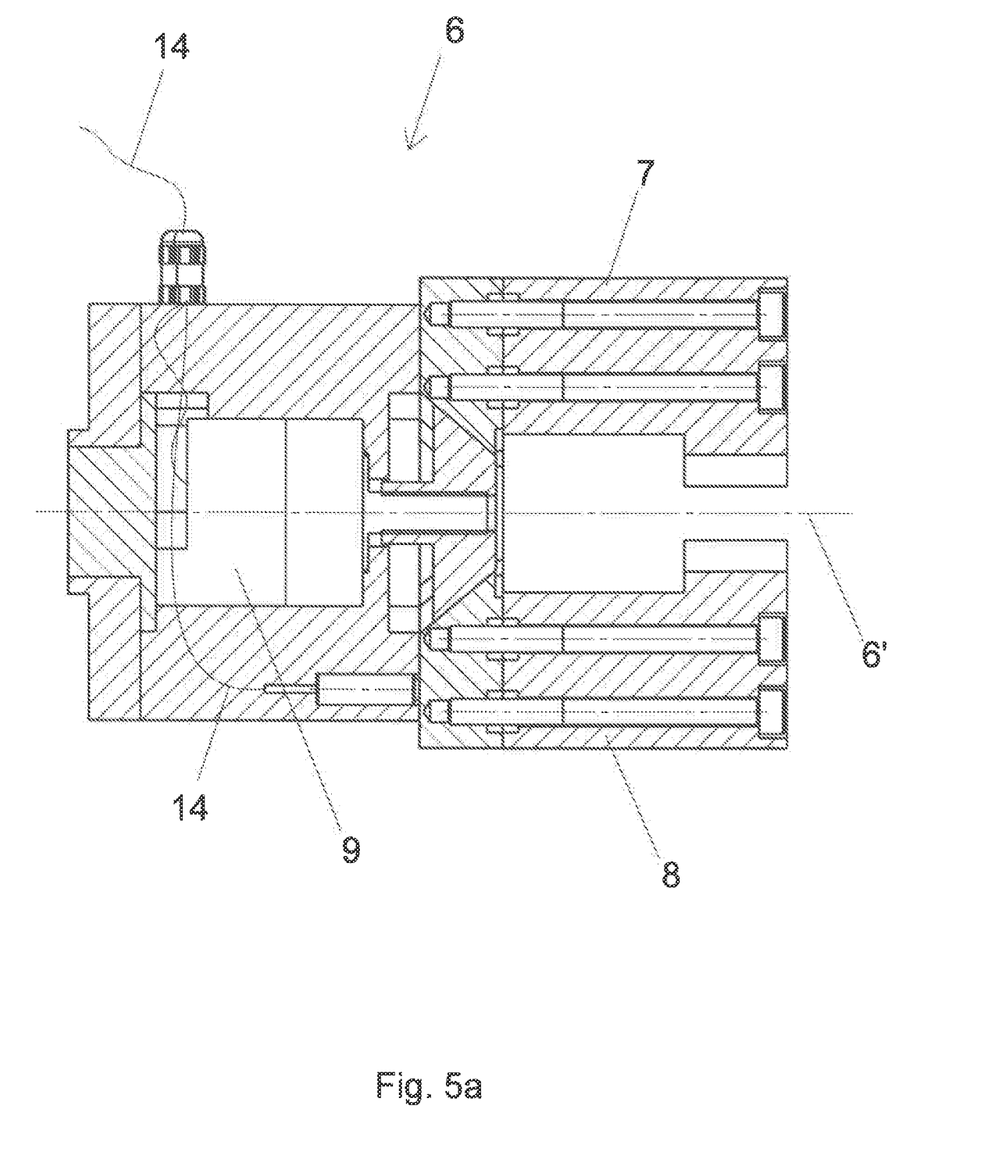
FIG. 5a shows a section through the robot arm according to FIG. 3a, and FIG. 5b shows a section through the robot arm according to FIG. 3b.
Figure 5B:
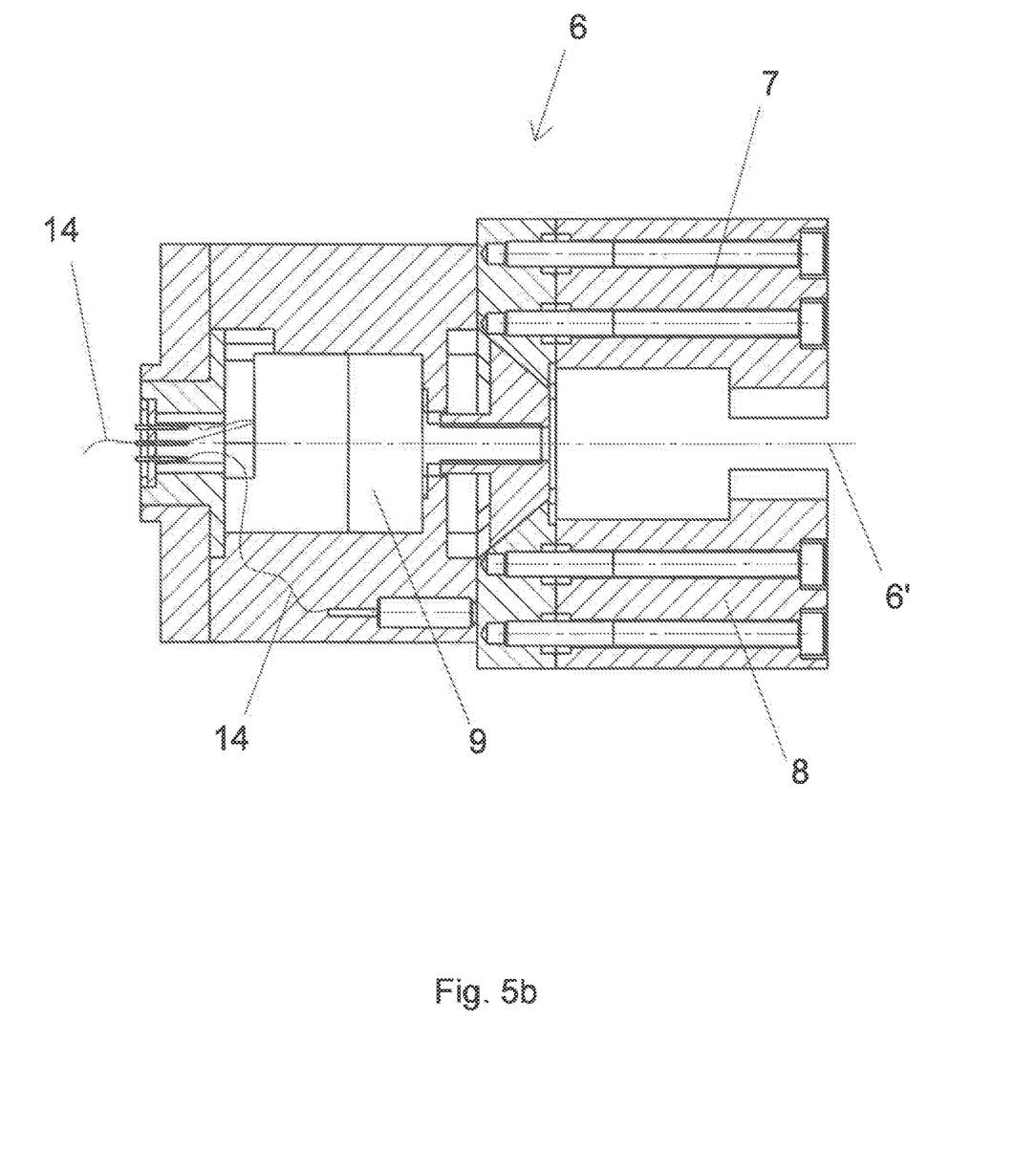

FIGS. 5a and 5b in particular show that there is an air gap 21 between the drive flange 11 and the gripping and/or holding device 6 connected to it. Since the two transceiver devices 12, 13 provide inductive energy and/or signal transmission, no electrical lines are required to bridge the air gap 21. This allows the gripping and/or holding device 6 to rotate freely about its own longitudinal axis 6'. There is therefore no need to return to a starting position to introduce electrical cables.

What is claimed is:

1. A robot (1) for gripping and/or holding objects (2), in particular workpieces, tools or carrier parts, the robot comprising:
   at least one robot arm (3, 4, 5) which is supported on a support frame (19) and is movable in space in at least one translational and/or rotational degree of freedom,
   a gripping and/or holding device (6), on which the respective object (2) is supported in a positionally oriented manner and/or held in a rotational arrangement,
   at least one electric motor (9) provided in the gripping and/or holding device (6), by means of which a torque and/or a clamping force is generated which acts on the object (2), and
   a drive shaft (24) mounted in the robot arm (5), which is coupled in a driving manner to the gripping and/or holding device (6) in such a way that the gripping and/or holding device (6) rotates about its own longitudinal axis (6'),
   wherein an interface (31) is provided between a free end (10) of the robot arm (5) at the end and the gripping and/or holding device (6), which interface (31) is bridged by a coupler (25) fixed in a non-rotating arrangement to the robot arm (5) and by a flange (11) adapted thereto, which flange (11) is connected in a non-rotating arrangement to the gripping and/or holding device (6) and the drive shaft (24),
   characterized in that,
   a first inductively operated transceiver (12) is provided in the coupler (25), which transceiver (12) is connected to a power source (15) via an electrical line (14) fed to the robot arm (5),
   a second inductively operated transceiver (13) is provided in the flange (11), which transceiver (13) is connected to the electric motor (9) in the gripping and/or holding device (6) via electrical lines (14),
   an air gap (21) is provided between the coupler (25) and the flange (11) as part of the interface (31),
   the drive shaft (24) passes through the air gap (21) and is coupled in a driving arrangement to the flange (11),
   the first and second inductive transceiver devices (12, 13) transmit electrical voltages and/or electrical signals, by means of which the electric motor (9) in the gripping and/or holding device (6) is controlled and monitored, and
   the gripping and holding device (6) comprises a plurality of sensors by means of which the signals from the gripping and holding device (6) are transmitted to the coupler (25) via an interface or bus interface.

2. The robot according to claim 1, characterized in that,
   at least one modulator (26, 26.1) and one demodulator (27, 27.1) are provided in each of the transceiver devices (12, 13), by means of which electrical energy and electrical signals are transmitted alternately between the two transceiver devices (12, 13).

3. The robot according to claim 2, characterized in that, a pair of coils (28, 29) is assigned to each pair of modulator (26, 26.1) and demodulator (27, 27.1).

4. The robot according to claim 1, characterized in that, an arrangement of serial receive signal transmission interfaces is assigned to the coupler (25) through which a signal or energy transmission is effected bidirectionally.

5. The robot according to claim 1, characterized in that, a torque support (16) is fastened between the free end (10) of the robot arm (5) at the end and the coupler (25), by means of which torque support (16) the coupler (25) is locked in a rotationally fixed manner on the robot arm (4).

6. The robot according to claim 5, characterized in that, the torque support (16) is designed as a rod or strip and in that the two free ends of the torque support (16) are fastened to the robot arm (5) or the coupler (25) by means of fastening screws (16, 17).

7. The robot according to claim 1, characterized in that, the gripping and/or holding device (6) can be rotated clockwise and counterclockwise and in that the gripping and/or holding device (6) can be rotated infinitely or without limit in one direction of rotation.

8. The robot according to claim 1, characterized in that, one or more thrust pieces (7, 8) are attached to the free end of the gripping and/or holding device (6), by means of which the respective object (2) is locked on the gripping and/or holding device (6).

9. The robot according to claim 1, characterized in that, electrical lines (14) are provided between the flange (11) and the gripping and/or holding device (6), which lines (14) run inside or outside the gripping and/or holding device (6) or the flange (11).

10. The robot according to claim 1, characterized in that, the thrust pieces (7, 8) are mounted on the gripping and/or holding device (6) so as to be displaceable in the radial direction or lock the object (2) designed as a tool in such a way that the tool processes a workpiece.

11. The robot according to claim 1, characterized in that, the rotational speed of the gripping and/or holding device (6) is generated by the drive shaft (24).

* * * * *